(12) United States Patent
Gérard et al.

(10) Patent No.: US 12,018,134 B2
(45) Date of Patent: Jun. 25, 2024

(54) PROCESSES FOR PREPARING DRIED POLYSACCHARIDES

(71) Applicant: GLAXOSMITHKLINE BIOLOGICALS SA, Rixensart (BE)

(72) Inventors: Jacques Dominique Gérard, Gembloux (BE); Jean-François Paul Hochstenbach, Gembloux (BE)

(73) Assignee: GLAXOSMITHKLINE BIOLOGICAL SA, Rixensart (BE)

( * ) Notice: Subject to any disclaimer, the term of this patent is extended or adjusted under 35 U.S.C. 154(b) by 273 days.

(21) Appl. No.: 17/260,722

(22) PCT Filed: Jul. 17, 2019

(86) PCT No.: PCT/EP2019/069286
§ 371 (c)(1),
(2) Date: Jan. 15, 2021

(87) PCT Pub. No.: WO2020/016322
PCT Pub. Date: Jan. 23, 2020

(65) Prior Publication Data
US 2021/0269603 A1   Sep. 2, 2021

(30) Foreign Application Priority Data

Jul. 19, 2018   (EP) .................... 18184534

(51) Int. Cl.
*C08J 3/12*   (2006.01)
*B01J 2/04*   (2006.01)
*C08B 37/00*   (2006.01)

(52) U.S. Cl.
CPC ................ *C08J 3/122* (2013.01); *B01J 2/04* (2013.01); *C08B 37/0003* (2013.01); *C08J 2305/00* (2013.01)

(58) Field of Classification Search
CPC ..... B01J 2/04; C08B 37/0003; C08J 2305/00; C08J 3/122
See application file for complete search history.

(56) References Cited

U.S. PATENT DOCUMENTS

2005/0266011 A1* 12/2005 Maa ................ A61K 39/12
424/184.1
2011/0195086 A1   8/2011 Caulfield et al.

FOREIGN PATENT DOCUMENTS

| CN | 105131139 A | 12/2015 | |
|---|---|---|---|
| WO | 2012163884 A1 | 12/2012 | |
| WO | 2014103828 A1 | 7/2014 | |
| WO | WO2014103828 * | 7/2014 | ............. C08B 37/00 |

OTHER PUBLICATIONS

WO2014103828 Machine translation done on Jan. 18, 2023.*
Communication Pursuant to Article 94(3) EPC from corresponding EP Appln. No. 19740000.5, dated Sep. 11, 2023 (8 pages).
International Search Report and Written Opinion for corresponding International Application No. PCT/EP2019/069286, mailed Aug. 27, 2019 (10 pages).
Burey et al., Carbohydrate Polymers, 76: 206-213 (2009).

* cited by examiner

*Primary Examiner* — Pancham Bakshi

(57) ABSTRACT

There is provided inter alia a process for drying an isolated polysaccharide comprising the step of spray drying a liquid composition comprising the isolated polysaccharide.

13 Claims, No Drawings

PROCESSES FOR PREPARING DRIED POLYSACCHARIDES

FIELD OF THE INVENTION

The present invention relates to improved processes for the preparation of dried polysaccharides.

BACKGROUND OF THE INVENTION

Polysaccharides are major components of the surface of bacteria. Immunological responses to capsular polysaccharide antigens have been shown to provide protection against bacterial disease. A number of vaccines based on capsular polysaccharide antigens have been developed, including e.g. vaccines against *Neisseria meningitidis, Streptococcus pneumoniae*, Group B *Streptococcus* and *Haemophilus influenzae*.

It is important that the polysaccharides to be used in vaccines are adequately purified from other bacterial components. Additionally, for convenient transport and storage the purified polysaccharides are suitably dried. These can be difficult and expensive processes on an industrial scale. For example, one current method involves a laborious multi-step process requiring at least one precipitation step to separate solid polysaccharide from the residual purification buffer. Precipitation requires a substantial volume of solvent and subsequently requires several washing steps and drying.

Hence there remains a need for a process that allows the production of dried polysaccharide antigens at an industrial scale in a more convenient manner.

Although spray drying is a well-known drying technique, it has found limited use in the vaccine field. The structural and chemical nature of biopharmaceutical molecules including proteins and polysaccharides renders them susceptible to degradation via mechanisms including denaturation, aggregation, deamidation and hydrolysis.

One of the biggest concerns with spray drying of polysaccharides is that the process involves drying with heated air and elevated temperatures may impact the integrity of the polysaccharides structure.

Processes of the prior art that use spray drying to produce vaccines have required stabilising components to protect antigens from damage caused by spray drying conditions. For example, Chen et al 2010 discloses the use of spray drying in the production of a thermostable *Neisseria meningitides* A protein-polysaccharide conjugate vaccine. All spray dried *Neisseria meningitides* formulations contained trehalose or lactose protectants, to stabilize the formulations. The authors indicate that the spray drying of polysaccharide-protein conjugate vaccines had not been reported previously and identified a variability in yield which they state would need to be addressed before scaling up the process.

Zhu et al 2014 discloses the use of a spray drying process to stabilise an influenza hemagglutinin peptide antigen as a model vaccine candidate. Eight formulations were prepared containing a range of excipients, such as trehalose, dextran, sucrose, arginine, hydrolysed gelatin, PVP-40 and hydrolysed lecithin. Not all formulations protected the vaccine candidate from damage during spray drying. The authors attributed high yields for the best formulations to the choice of excipients and operating conditions.

Similarly, US 2005/0266011 exemplifies spray-dried immunologically active agents such as influenza hemagglutinin peptide formulated with excipients such as sucrose. The authors state that sucrose-containing formulations disclosed therein benefited from no protein loss, nor changes in molecular weight after spray drying.

Ohtake et al 2010 discloses the use of a spray drying process used to produce heat-stable measles vaccine powder. Live attenuated measles virus was spray dried with a combination of unique stabilisers under mild process conditions. The stabilisers included trehalose, sucrose, myo-inositol, arginine, glycerol and Pluronic F68.

McAdams et al 2012 provides a review of spray drying and vaccine stabilisation.

SUMMARY OF THE INVENTION

The present invention provides a process for drying an isolated polysaccharide comprising the step of spray drying a liquid composition comprising the isolated polysaccharide. There is also provided an isolated polysaccharide obtainable or obtained by the process, a conjugate comprising an isolated polysaccharide obtainable or obtained by the process, a pharmaceutical composition or immunogenic composition comprising the polysaccharide or conjugate and methods of treatment and uses involving the same.

DETAILED DESCRIPTION OF THE INVENTION

It is an object of the present invention to provide an improved process for preparing dried polysaccharides. Surprisingly, the processes of the present invention achieve high yield of dried, substantially intact polysaccharides in a convenient manner. In some embodiments this is achieved without the use of protecting agents, precipitation steps and/or high concentrations of feed polysaccharide solution. In further embodiments, the properties of the spray dried polysaccharides are within desired specification parameters.

Polysaccharides

The term "polysaccharide" refers to polymeric carbohydrate molecules consisting of multiple monosaccharide units bound together by glycosidic linkages. In one embodiment the monosaccharide units may be modified monosaccharides, for example by the addition of one or more lipids, resulting in a liposaccharide. Polysaccharides used in the invention may therefore include, for example, lipopolysaccharides (including lipooligosaccharides). Monosaccharides may also be modified the addition of functional groups such as o-acetyl, uronic acid, hexosamine and methylpentose.

Monosaccharides include pentoses, hexoses, deoxyhexoses, aminodeoxyhexoses, diaminodideoxyhexoses, diaminotrideoxyhexoses, hexuronic acids, aminodeoxyhexuronic acids, heptoses, octulosonic acids, nonulosonic acids, branched monosaccharides, monosaccharides with noncarbohydrate substituents (e.g., O-methyl, O-(1-carboxyethyl), O-acetyl, O-lactyl, O-(2-hydroxypropionyl), O-(2,4-dihydroxybutyryl), phosphate, sulfate, N-acetyl, N-glycolyl, N-(2-aminopropionyl), pyruvate).

The polysaccharide according to the present invention is isolated. The term "isolated" means the polysaccharide is separated from its normal, natural environment but is not chemically modified. Chemical modification includes conjugation to substances which are not saccharides or isolated polysaccharides, such as proteins. The terms protein, peptide and polypeptide are used interchangeably herein. Accordingly, the isolated polysaccharide according to the invention is not conjugated to other molecules, especially proteins.

In one embodiment, the isolated polysaccharide has between about 0% and about 40% O-acetylation, such as less than about 5%, less than about 4%, less than about 3%, less than about 2%, or less than about 1% O-acetylation. In one embodiment, the isolated polysaccharide has at least about 0.1, 0.2, 0.3, 0.35 or about 0.4 mM 0-acetate per mM saccharide repeating unit. In another embodiment, the isolated polysaccharide has less than about 0.01, 0.02, 0.03, 0.04, or 0.05 mM O-acetate per mM saccharide repeating unit.

In an alternative embodiment, monosaccharide units may be unmodified.

Suitably the isolated polysaccharide is an isolated capsular polysaccharide. More suitably, a capsular isolated polysaccharide antigen. A capsular isolated polysaccharide antigen is a capsular isolated polysaccharide which is capable of eliciting an immune response upon administration to a subject.

A capsular polysaccharide is a polysaccharide which is naturally found within the capsule of bacterial cells. Thus, they may be referred to as bacterial capsular polysaccharides.

Capsular polysaccharides are suitably water-soluble, suitably acidic or neutral (most suitably acidic), and suitably have molecular weights on the order of 100-2000 kDa. They are suitably linear and suitably consist of repeating subunits of one to six monosaccharides.

Suitably the isolated polysaccharide has a molecular weight from about 5 kDa to about 2,000 kDa, more suitably from about 50 kDa to about 1800 kDa, more suitably from about 80 kDa to about 1500 kDa, more suitably from about 100 kDa to about 1400 kDa, more suitably from about 150 kDa to about 1300 kDa, or most suitably from about 200 kDa to about 1200 kDa.

The skilled person will appreciate that increasing molecular weight contributes to increasing viscosity of the polysaccharide in solution, alongside multiple other parameters. The skilled person will appreciate that spray drying efficiency will be reduced when using viscosities which are too low or two high and will adjust parameters to alter viscosity accordingly.

Suitably the isolated polysaccharide of the present invention is derived from bacteria, suitably Gram-positive bacteria.

The isolated polysaccharide in one embodiment is derived from a bacterium belonging to a genus selected from the list consisting of *Haemophilus* (such as *Haemophilus influenzae*, such as *Haemophilus influenzae* type b (Hib)), *Streptococcus* (such as *Streptococcus pneumoniae* (pneumococcus), Group A streptococcus (GAS, such as *Streptococcus pyogenes*) and Group B streptococcus (GBS)), *Neisseria* (such as *Neisseria meningitidis* (meningococcus, serogroups A, B, C, W135 and/or Y), *Klebsiella* (such as *Klebsiella pneumoniae*), *Clostridium difficile*, *Candida albicans*, *Pseudomonas aeruginosa*, *Salmonella* (such as *Salmonella typhi*), *Streptococcus agalactiae* (types Ia, Ib, II, III, IV, V, VI, VII, VIII and/or IX, *Staphylococcus aureus* (from, for example, serotypes 5 and 8), *Enterococcus faecalis* or *E. faecium* (trisaccharide repeats), *Yersinia enterocolitica*, *Vibrio cholerae*. Other polysaccharides which may be included in the compositions of the invention include glucans (e.g. fungal glucans, such as those in *Candida albicans*), and fungal capsular polysaccharides e.g. from the capsule of *Cryptococcus neoformans*. Another polysaccharides which may be included is the *Streptococcus pyogenes* group-specific antigen (GAS carbohydrate). More suitably the isolated polysaccharide is derived from a bacterium belonging to the *Streptococcus* genus, such as group B *Streptococcus* or *Streptococcus pneumoniae*.

The isolated polysaccharide is most suitably derived from *Streptococcus pneumoniae*. Suitably the isolated polysaccharide in one embodiment is Pneumococcal polysaccharide serotype 1 (PS1), Pneumococcal polysaccharide serotype 4 (PS4), Pneumococcal polysaccharide serotype 5 (PS5), Pneumococcal polysaccharide serotype 6B (PS6B), Pneumococcal polysaccharide serotype 7F (PS7F), Pneumococcal polysaccharide serotype 9V (PS9V), Pneumococcal polysaccharide serotype 14 (PS14), Pneumococcal polysaccharide serotype 18C (PS18), Pneumococcal polysaccharide serotype 19F (PS19F), Pneumococcal polysaccharide serotype 23F (PS23F). The isolated polysaccharide in one embodiment is derived from *Streptococcus pneumoniae* serotypes 1, 4, 5, 6B, 7F, 9V, 14, 18C, 19F or 23F, more suitably 7F or 14.

Alternatively, the isolated polysaccharides are selected from the list consisting of Group B *Streptococcus* serotype Ia capsular isolated polysaccharide (CPS Ia), Group B *Streptococcus* serotype Ib capsular isolated polysaccharide (CPS Ib), Group B *Streptococcus* serotype II capsular isolated polysaccharide (CPS II), Group B *Streptococcus* serotype III capsular isolated polysaccharide (CPS III), Group B *Streptococcus* serotype IV capsular isolated polysaccharide (CPS IV) and Group B *Streptococcus* serotype V capsular isolated polysaccharide (CPS V). More particularly, the isolated polysaccharides are selected from the list consisting of Group B *Streptococcus* serotype Ia capsular isolated polysaccharide (CPS Ia), Group B *Streptococcus* serotype Ib capsular isolated polysaccharide (CPS Ib) and Group B *Streptococcus* serotype III capsular isolated polysaccharide (CPS III).

The isolated polysaccharide obtainable by (such as obtained by) the process according to any of the methods described herein forms a further aspect of the invention.

Polysaccharide Production

The isolated polysaccharide may be obtained from bacteria using a range of means. For example, the bacteria may be grown in a fermentation vessel. At the end of a fermentation cycle, the bacterial cells may be chemically inactivated by phenol. The particular isolated polysaccharide of interest may be separated from bacterial cell debris by, for example performing one impurities complexation step with CTAB (cetyltrimethylammonium bromide) onto inert diatomaceous earth (e.g. celite 545) to eliminate cell debris, nucleic acids, and proteins. This is followed by an ultrafiltration step aimed to eliminate small nucleic acids and phenol and to change the buffer for the next step. This is then followed by a complexation step with CTAB onto inert diatomaceous earth (e.g. celite 512) to eliminate CPS (C-polysaccharide).

As discussed above, polysaccharide purification is frequently based on precipitation with a quaternary ammonium salt, (such as CTAB or Cetavlon). This cationic detergent forms insoluble complexes with several polyanions such as acid polysaccharides, nucleic acids and proteins depending on their isoelectric point. Celite is used as a dispersing agent (and thus as a filter aid) to avoid the formation of insoluble masses.

Suitably the process of the invention comprises at least one step of filtering the liquid composition before the spray drying step. Filtration suitably achieves a substantially pure isolated polysaccharide liquid composition, such as an at least 90% pure, such as an at least 95% pure, such as an at least 98% pure, such as an at least 99% pure, such as an at least 99.5% pure, such as an at least 99.8% pure, such as an at least 99.9% pure, such as an at least 99.95% pure, such as an at least 99.99% pure polysaccharide solution (w/w).

Percentage purity as used herein refers to the proportion of isolated polysaccharide relative to other dissolved or suspended components in the composition. A 100% pure isolated polysaccharide liquid composition consists of liquid solvent and isolated polysaccharide. No other dissolved or suspended components are present in such a composition.

Any filtration method which achieves a level of polysaccharide purity suitable for spray drying may be used. Such methods include membrane filtration such as ultrafiltration and tangential flow filtration.

Suitably, filtration is achieved by at least one tangential flow filtration (TFF) step before the spray drying step, such as at least two tangential flow filtration steps. The aim of this step is to remove small protein contaminants from the liquid composition. Suitably, the process comprises at least one TFF filtration step using celite and CTAB before the spray drying step, such as at least two such filtration steps.

Conjugates

After the polysaccharides have been produced using the spray drying processes described herein, they may be conjugated to proteins (e.g. protein carriers or antigenic proteins) or another polysaccharide. This will produce a conjugate of the invention.

The protein carrier may be any protein. It may comprise one or more T-helper epitopes. In one embodiment of the invention the protein carrier is selected from the group consisting of: TT, DT, CRM197, fragment C of TT, protein D of *H. influenzae*, pneumococcal PhtD, and pneumococcal Pneumolysin. The carrier protein may be tetanus toxoid (TT), tetanus toxoid fragment C, non-toxic mutants of tetanus toxin, diphtheria toxoid (DT), CRM197, other non-toxic mutants of diphtheria toxin (such as CRM176, CRM 197, CRM228, CRM9, CRM45, CRM102, CRM103 and CRM107 and those comprising other mutations described by Nicholls and Youle in Genetically Engineered Toxins, Ed: Frankel, Maecel Dekker Inc, 1992; deletion or mutation of Glu-148 to Asp, Gln or Ser and/or Ala 158 to Gly and other mutations disclosed in U.S. Pat. No. 4,709,017 or U.S. Pat. No. 4,950,740; mutation of at least one or more residues Lys 516, Lys 526, Phe 530 and/or Lys 534 and other mutations disclosed in U.S. Pat. No. 5,917,017 or U.S. Pat. No. 6,455,673; or fragment disclosed in U.S. Pat. No. 5,843,711), pneumococcal pneumolysin (Kuo et al 1995), OMPC (meningococcal outer membrane protein—usually extracted from *N. meningitidis* serogroup B—EP0372501), synthetic peptides (EP0378881, EP0427347), heat shock proteins (WO 93/17712, WO 94/03208), pertussis proteins (WO 98/58668, EP0471177), cytokines, lymphokines, growth factors or hormones (WO 91/01146), artificial proteins comprising multiple human CD4+ T cell epitopes from various pathogen derived antigens (Falugi et al 2001) such as N19 protein (Baraldoi et al 2004) pneumococcal surface protein PspA (WO 02/091998), iron uptake proteins (WO 01/72337), toxin A or B of *C. difficile* (WO 00/61761), *H. influenzae* Protein D (EP594610 and WO 00/56360), pneumococcal PhtA (WO 98/18930, also referred to Sp36), pneumococcal PhtD (disclosed in WO 00/37105, and is also referred to Sp036D), pneumococcal PhtB (disclosed in WO 00/37105, and is also referred to Sp036B), or PhtE (disclosed in WO00/30299 and is referred to as BVH-3). Most suitably the protein carrier is CRM 197.

The isolated polysaccharide may be linked to the carrier protein by any known method (for example, by the methods of Likhite, U.S. Pat. No. 4,372,945 and of Armor et al., U.S. Pat. No. 4,474,757), with any suitable linker where necessary. Isolated polysaccharides may be conjugated to a carrier protein for instance by a method using carbodiimide (e.g. EDAC) condensation chemistry.

Linkages via a linker group may be made using any known procedure, for example, the procedures described in U.S. Pat. Nos. 4,882,317 and 4,695,624. One type of linkage involves reductive amination of the isolated polysaccharide, coupling the resulting amino group with one end of an adipic acid linker group (EP 0477508, Porro et al. 1985, EP 0208375), and then coupling a protein to the other end of the adipic acid linker group. As an alternative to using a linker, direct linkage can be used. Direct linkages to the protein may comprise oxidation of the isolated polysaccharide followed by reductive amination with the protein, as described in, for example U.S. Pat. Nos. 4,761,283 and 4,356,170 or a direct CDAP reaction. Most suitably the isolated polysaccharide is conjugated to a protein by an ADH (adipic acid dihydrazide) linker.

The isolated polysaccharide will typically be activated or functionalised prior to conjugation. Activation may involve, for example, cyanylating agents such as CDAP (1-cyano-dimethylaminopyridinium tetrafluoroborate) (WO 95/08348 & WO 96/29094). Other suitable techniques use hydrazides, active esters, norborane, p-nitrobenzoic acid, N-hydroxysuccinimide, S-NHS, EDC or TSTU.

In addition, the isolated polysaccharide may be conjugated by techniques including: (1) direct coupling via protein functional groups {e.g., thiol-thiol linkage, amine-carboxyl linkage, amine-aldehyde linkage; enzyme direct coupling); (2) homobifunctional coupling of amines {e.g., using bis-aldehydes); (3) homobifunctional coupling of thiols {e.g., using bis-maleimides); (4) homobifunctional coupling via photoactivated reagents (5) heterobifunctional coupling of amines to thiols {e.g., using maleimides); (6) heterobifunctional coupling via photoactivated reagents {e.g., the β-carbonyidiazo family); (7) introducing amine-reactive groups into a poly- or oligosaccharide via cyanogen bromide activation or carboxymethylation; (8) introducing thiol-reactive groups into a poly- or oligosaccharide via a heterobifunctional compound such as maleimido-hydrazide; (9) protein-lipid conjugation via introducing a hydrophobic group into the protein and (10) protein-lipid conjugation via incorporating a reactive group into the lipid. Also contemplated are heterobifunctional "non-covalent coupling" techniques with the Biotin-Avidin interaction.

In an embodiment, polysaccharide-protein conjugates are obtained by activating the polysaccharide with 1-cyano-4-dimethylamino pyridinium tetrafluoroborate (CDAP) to form a cyanate ester. The activated polysaccharide may be coupled directly or via a spacer (linker) group to an amino group on the carrier protein. For example, the spacer could be cystamine or cysteamine to give a thiolated polysaccharide which could be coupled to the carrier via a thioether linkage obtained after reaction with a maleimide-activated carrier protein (for example using GMBS) or a haloacetylated carrier protein (for example using iodoacetimide, SIB, SIAB, sulfo-SIAB, SIA, or SBAP).

In one aspect, the cyanate ester (optionally made by CDAP chemistry) is coupled with hexane diamine or adipic acid dihydrazide (ADH) and the amino-derivatised saccharide is conjugated to the carrier protein using carbodiimide (e.g., EDAC or EDC) chemistry via a carboxyl group on the protein carrier. Such conjugates are described for example in International Patent Appl. Pub. Nos. WO 93/15760, WO 95/08348, and WO 96/29094.

Pharmaceutical Compositions

The isolated polysaccharides and conjugates of the present invention are suitable for use in pharmaceutical compositions, such as immunogenic compositions (such as vaccine compositions).

The isolated polysaccharide can be used at amounts between 1 and 100 ug per human dose of the pharmaceutical composition. The isolated polysaccharide may be used at a level of about 50 ug, for example between 40 to 60 ug, suitably between 45 to 55 ug or between 49 and 51 ug or 50 ug. In a further embodiment, the human dose of the pharmaceutical composition comprises the isolated polysaccharide at a level of about 25 ug, for example between 20 to 30 ug, suitable between 21 to 29 ug or between 22 to 28 ug or between 23 and 27 ug or between 24 and 26 ug, or 25 ug.

In one embodiment there is provided a pharmaceutical composition comprising an isolated polysaccharide or conjugate of the invention and a pharmaceutically acceptable excipient.

Pharmaceutically acceptable excipients include any excipient that does not itself induce the production of antibodies harmful to the individual receiving the composition. Suitable excipients include water, saline, glycerol, polylactic acids, polyglycolic acids, polymeric amino acids, amino acid copolymers, sucrose, trehalose, lactose and lipid aggregates.

Pharmaceutical compositions within the scope of the present invention may also contain other compounds, which may be biologically active or inactive. For example, one or more immunogenic portions of other polysaccharide or polypeptide antigens may be present, either incorporated via the conjugation methods described above to form a conjugate or as a separate compound, within the pharmaceutical composition.

It will be apparent that a pharmaceutical composition may contain pharmaceutically acceptable salts. Such salts may be prepared from pharmaceutically acceptable non-toxic bases, including organic bases (e.g., salts of primary, secondary and tertiary amines and basic amino acids) and inorganic bases (e.g., sodium, potassium, lithium, ammonium, calcium and magnesium salts).

While any suitable carrier known to those of ordinary skill in the art may be employed in the pharmaceutical compositions formulated, the type of carrier will vary depending on the mode of administration. Compositions of the present invention may be formulated for any appropriate manner of administration, including for example, topical, oral, nasal, intravenous, intracranial, intraperitoneal, subcutaneous or intramuscular administration. For parenteral administration, such as subcutaneous injection, the carrier preferably comprises water, saline, alcohol, a fat, a wax or a buffer. For oral administration, any of the above carriers or a solid carrier, such as mannitol, lactose, starch, magnesium stearate, sodium saccharine, talcum, cellulose, glucose, sucrose, and magnesium carbonate, may be employed. Biodegradable microspheres (e.g., polylactate polyglycolate) may also be employed as carriers for the pharmaceutical compositions of this invention.

If delivered by parenteral administration, the pH of the pharmaceutical compositions should be suitable for parenteral administration. Typically the pH will be in the range of 4.0 to 9.0. Suitably the pH will be in the range 5.0 to 8.0, especially 5.25 to 6.75, such as 6.5 to 7.5, in particular pH 6.75 to 7.25. A pH of about 6.0 is of particular interest. The pH may be controlled by the use of buffers, including for example Tris or phosphate buffers.

The isolated polysaccharides and conjugates of the present invention may be formulated in a composition to form an immunogenic composition, which suitably comprises an immunostimulant. An immunostimulant is any substance that enhances or potentiates an immune response (antibody and/or cell-mediated) to an exogenous antigen. Examples of immunostimulants include adjuvants, biodegradable microspheres (e.g., polylactic galactide) and liposomes (into which the compound is incorporated; see, e.g., Fullerton, U.S. Pat. No. 4,235,877). Preparation of immunogenic compositions is generally described in, for example, Powell & Newman, eds., Vaccine Design (the subunit and adjuvant approach) (1995). The immunogenic compositions described herein may in some embodiments be used as vaccines.

An example of an immunostimulant is an adjuvant. Most adjuvants contain a substance designed to protect the antigen from rapid catabolism, such as aluminium hydroxide or mineral oil, and a stimulator of immune responses, such as lipid A, Bortadella pertussis or *Mycobacterium* species or *Mycobacterium* derived proteins. For example, delipidated, deglycolipidated M. vaccae ("pVac") can be used. Suitable adjuvants are commercially available as, for example, Freund's Incomplete Adjuvant and Complete Adjuvant (Difco Laboratories, Detroit, MI); Merck Adjuvant 65 (Merck and Company, Inc., Rahway, NJ); AS01B, AS02A, AS15, AS-2 and derivatives thereof (GlaxoSmithKline, Philadelphia, PA); CWS (cell wall skeleton from a tubercule bacillus), TDM (trehalose dicorynomycolate), Leif (*Leishmania* elongation initiation factor), aluminium salts such as aluminium hydroxide gel (alum) or aluminum phosphate; salts of calcium, iron or zinc; an insoluble suspension of acylated tyrosine; acylated sugars; cationically or anionically derivatized polysaccharides; polyphosphazenes; biodegradable microspheres; monophosphoryl lipid A (MPL®) (e.g. 3D-MPL); and quil A (e.g. QS17 or QS21, suitably QS21). Cytokines, such as GM-CSF or interleukin-2, -7, or -12, may also be used as adjuvants.

In a particular embodiment, the immunogenic composition comprises both a saponin and a TLR4 agonist. In a specific example, the immunogenic composition comprises QS21 and 3D-MPL.

A TLR-4 agonist, such as a lipopolysaccharide, such as 3D-MPL, can be used at amounts between 1 and 100 ug per human dose of the immunogenic composition. 3D-MPL may be used at a level of about 50 ug, for example between 40 to 60 ug, suitably between 45 to 55 ug or between 49 and 51 ug or 50 ug. In a further embodiment, the human dose of the immunogenic composition comprises 3D-MPL at a level of about 25 ug, for example between 20 to 30 ug, suitable between 21 to 29 ug or between 22 to 28 ug or between 23 and 27 ug or between 24 and 26 ug, or 25 ug.

A saponin, such as QS21, can be used at amounts between 1 and 100 ug per human dose of the immunogenic composition. QS21 may be used at a level of about 50 ug, for example between 40 to 60 ug, suitably between 45 to 55 ug or between 49 and 51 ug or 50 ug. In a further embodiment, the human dose of the immunogenic composition comprises QS21 at a level of about 25 ug, for example between 20 to 30 ug, suitable between 21 to 29 ug or between 22 to 28 ug or between 23 and 27 ug or between 24 and 26 ug, or 25 ug.

Where both TLR4 agonist and saponin are present in the immunogenic composition, then the weight ratio of TLR4 agonist to saponin is suitably between 1:5 to 5:1, suitably between 1:2 to 2:1, such as about 1:1. For example, where 3D-MPL is present at an amount of 50 ug or 25 ug, then suitably QS21 may also be present at an amount of 50 ug or 25 ug, respectively, per human dose of the immunogenic composition. Certain immunogenic compositions of the present invention comprise QS21 and 3D-MPL, at an amount of between 1 and 100 ug of each per human dose, such as at an amount of between 10 and 75 ug of each per human dose. Immunogenic compositions of the present invention may suitably comprise QS21 and 3D-MPL, at an amount of between 15 and 35 ug of each per human dose, such as at an amount of between 20 and 30 ug of each per human dose.

In one embodiment, the immunostimulant is a TLR9 agonist, for example as set out in WO2008/142133. In a specific example, said TLR9 agonist is an immunostimulatory oligonucleotide, in particular an oligonucleotide containing an unmethylated CpG motif. Such oligonucleotides are well known and are described, for example, in WO96/02555, WO99/33488 and U.S. Pat. No. 5,865,462. Suitable TLR9 agonists for use in the immunogenic compositions described herein are CpG containing oligonucleotides, optionally containing two or more dinucleotide CpG motifs separated by at least three, suitably at least six or more nucleotides. A CpG motif is a cytosine nucleotide followed by a guanine nucleotide.

In one embodiment the internucleotide bond in the oligonucleotide is phosphorodithioate, or possibly a phosphorothioate bond, although phosphodiester and other internucleotide bonds could also be used, including oligonucleotides with mixed internucleotide linkages. Methods for producing phosphorothioate oligonucleotides or phosphorodithioate are described in U.S. Pat. Nos. 5,666,153, 5,278,302 and WO95/26204. Oligonucleotides comprising different internucleotide linkages are contemplated, e.g. mixed phosphorothioate phophodiesters. Other internucleotide bonds which stabilise the oligonucleotide may be used.

The pharmaceutical and immunogenic compositions may be used to protect or treat a mammal susceptible to infection, by means of administering said compositions via systemic or mucosal route. These administrations may include injection via the intramuscular, intraperitoneal, intradermal or subcutaneous routes; or via mucosal administration to the oral/alimentary, respiratory, genitourinary tracts. Intranasal administration of compositions for the treatment of pneumonia or otitis media is preferred (as nasopharyngeal carriage of pneumococci can be more effectively prevented, thus attenuating infection at its earliest stage). Although the compositions may be administered as a single dose, components thereof may also be co-administered together at the same time or at different times (for instance pneumococcal saccharide conjugates could be administered separately, at the same time or 1-2 weeks after the administration of the any bacterial protein component of the compositions for optimal coordination of the immune responses with respect to each other). For co-administration, an optional Th1 adjuvant may be present in any or all of the different administrations. In addition to a single route of administration, 2 different routes of administration may be used. For example, saccharides or saccharide conjugates may be administered IM (or ID) and bacterial proteins may be administered IN (or ID). In addition, the compositions may be administered IM for priming doses and IN for booster doses.

In one aspect of the invention is provided a vaccine kit, comprising a vial containing an isolated polysaccharide antigen of the invention and further comprising a vial containing a pharmaceutical carrier as described herein. It is envisioned that in this aspect of the invention, the pharmaceutical carrier will be used to reconstitute the spray-dried polysaccharide antigen.

Further Composition Components

According to the present invention the isolated polysaccharide is comprised within a liquid composition, most suitably an aqueous composition.

As discussed above in respect of polysaccharide molecular weights, the skilled person will appreciate that multiple other parameters will impact viscosity of the polysaccharide solution. The skilled person will appreciate that spray drying efficiency will be reduced when using viscosities which are too low or two high and will adjust parameters to alter viscosity accordingly.

The viscosity of the liquid solution will impact spray drying performance and the parameters of the final dried polysaccharide powder. Suitably the liquid composition comprising the isolated polysaccharide has a viscosity of 1 to 150 cP, more suitably 5 to 120 cP, more suitably 10 to 100 cP, more suitably 15 to 95 cP, more suitably 20 to 90 cP, more suitably 25 to 85 cP.

Suitably the liquid composition comprises substantially pure isolated polysaccharide. Suitably the isolated polysaccharide is substantially free of contaminants. Suitably the isolated polysaccharide is substantially pure, such as at least 90%, such as at least 95%, such as at least 98%, such as at least 99%, such as at least 99.5%, such as at least 99.8%, such as at least 99.9%, such as at least 99.95%, such as at least 99.99% pure (w/w).

Suitably the liquid composition comprises at least 70% isolated polysaccharide, more suitably at least 80% isolated polysaccharide, more suitably at least 90% isolated polysaccharide, more suitably at least 95% isolated polysaccharide, more suitably at least 98% isolated polysaccharide, more suitably at least 99% isolated polysaccharide, more suitably at least 99.5% isolated polysaccharide, more suitably 100% isolated polysaccharide w/w (dry weight).

Suitably the liquid composition comprises a limited quantity of contaminants. Contaminants are any substances other than the isolated polysaccharide. Suitably the liquid composition comprises less than 20%, more suitably less than 10%, more suitably less than 5%, more suitably less than 2%, more suitably less than 1%, more suitably less than 0.5%, more suitably less than 0.2%, more suitably less than 0.1%, more suitably less than 0.05%, more suitably less than 0.01% w/w contaminants (dry weight). Most suitably the liquid composition comprises no contaminants.

Suitably the liquid composition comprises a low ratio of contaminants to isolated polysaccharide. Suitably the ratio of contaminants to isolated polysaccharide is 0.5:1 or lower, more suitably 0.3:1 or lower, more suitably 0.1:1 or lower, more suitably 0.05:1 or lower, more suitably 0.01:1 or lower (by dry weight).

The liquid composition may comprise a small amount of protein. Suitably the ratio of protein to isolated polysaccharide in the liquid composition will typically be between 0-5% (w/w), suitably between 0-4% (w/w), suitably between 0-3% (w/w), suitably 0-2% (w/w), preferably 0-1% (w/w) (dry weight). In another embodiment, the liquid composition comprises less than 1% protein, such as less than 0.5% protein, such as less than 0.1% protein, such as less than 0.05% protein, such as comprising no protein w/w (dry weight).

Suitably the liquid composition comprises a limited quantity of solids. Suitably the liquid composition comprises less than 20%, more suitably less than 10%, more suitably less than 5%, more suitably less than 2%, more suitably less than 1%, more suitably less than 0.5%, more suitably less than 0.2%, more suitably less than 0.1%, more suitably less than 0.05%, more suitably less than 0.01% w/w solids (dry weight). Most suitably the liquid composition comprises no solids.

The liquid composition may comprise protectants. A protectant is a substance that protects the structure of the polysaccharide, substantially preventing break down or loss of functional groups e.g. glassy sugars such as trehalose, sucrose and lactose. Suitably the ratio of all protectants to all polysaccharides in the liquid composition will typically be between 0-5% (w/w), suitably between 0-4% (w/w), suitably between 0-3% (w/w), suitably 0-2% (w/w), preferably 0-1% (w/w). In another embodiment, the liquid composition comprises less than 1% (w/w), such as less than 0.5% (w/w), such as less than 0.2% (w/w), such as less than 0.1% (w/w), such as less than 0.05% (w/w), such as less than 0.01% (w/w) protectants. Most suitably, the liquid composition comprises no protectants.

In one embodiment the liquid composition comprises an isolated capsular polysaccharide and less than 1% (w/w), such as less than 0.5% (w/w), such as less than 0.2% (w/w), such as less than 0.1% (w/w), such as less than 0.05% (w/w), such as less than 0.01% (w/w) carbohydrates other than the isolated polysaccharide. Most suitably, the liquid composition comprises no carbohydrates other than the isolated capsular polysaccharide.

In one embodiment the liquid composition comprises an isolated capsular polysaccharide and is free of carbohydrates other than the isolated capsular polysaccharide. In one embodiment the liquid composition comprises an isolated capsular polysaccharide and does not comprise carbohydrates other than the isolated capsular polysaccharide.

In one embodiment the liquid composition comprises an isolated capsular polysaccharide and does not comprise an excipient.

In one embodiment the liquid composition comprises an isolated capsular polysaccharide and, other than the isolated capsular polysaccharide, does not comprise carbohydrates, monosaccharides, disaccharides, cyclodextrins, polysaccharides, starch, cellulose, salts, sodium phosphates, calcium phosphates, calcium sulfate, magnesium sulfate, citric acid, tartaric acid, glycine, polyethylene glycols (PEG's), pluronics or surfactants.

In one embodiment the liquid composition comprises an isolated capsular polysaccharide and does not comprise an excipient as defined in US 2005/0266011.

In one embodiment the liquid composition comprises one polysaccharide, wherein the polysaccharide is an isolated capsular polysaccharide.

In one embodiment the liquid composition comprises one polysaccharide, wherein the polysaccharide is an isolated capsular polysaccharide and wherein this polysaccharide is the only polysaccharide present in the liquid composition.

In one embodiment the liquid composition consists essentially of solvent and an isolated capsular polysaccharide. In one embodiment the liquid composition consists essentially of water and an isolated capsular polysaccharide.

In one embodiment the liquid composition consists of water and an isolated capsular polysaccharide.

Suitably the isolated capsular polysaccharide referred to above is PS 1, 4, 5, 6B, 7F, 9V, 14, 18C, 19F or 23F "Dry weight" as used herein refers to a composition wherein substantially all solvent has been removed, such as less than 0.01% solvent, such as less than 0.005% solvent, such as less than 0.001% solvent, such as comprising no solvent.

Treatment or Prevention of Disease

In one embodiment there is provided an isolated polysaccharide, conjugate or composition of the invention for use a medicament.

In a further embodiment there is provided an isolated polysaccharide, conjugate or composition of the invention for use in the treatment or prevention of bacterial infection.

In a further embodiment there is provided the use of an isolated polysaccharide, conjugate or composition of the invention for the manufacture of a medicament for the treatment or prevention of bacterial infection.

In a further embodiment there is provided a method of treating or preventing bacterial infection comprising the administration of a safe and effective dose of an isolated polysaccharide, conjugate or composition of the invention to a subject.

Suitably the bacteria referred to in the paragraphs above belong to a genus selected from the list consisting of *Haemophilus* (such as *Haemophilus influenzae*, such as *Haemophilus influenzae* type b (Hib)), *Streptococcus* (such as *Streptococcus pneumoniae* (pneumococcus), Group A *streptococcus* (GBS, such as *Streptococcus pyogenes*) and Group B *streptococcus* (GBS)), *Neisseria* (such as *Neisseria meningitidis* (meningococcus, serogroups A, B, C, W135 and/or Y), *Klebsiella* (such as *Klebsiella pneumoniae*), *Clostridium difficile*, *Candida albicans*, *Pseudomonas aeruginosa*, *Salmonella* (such as *Salmonella typhi*), *Streptococcus agalactiae* (types Ia, Ib, II, III, IV, V, VI, VII, and/or VIII, *Staphylococcus aureus* (from, for example, serotypes 5 and 8), *Enterococcus faecalis* or *E. faecium*, *Yersinia enterocolitica*, *Vibrio cholerae*. More suitably a bacterium belonging to the *Streptococcus* genus, such as group B *Streptococcus* or *Streptococcus pneumoniae*. Most suitably, *Streptococcus pneumoniae*.

Suitably the subject to be treated is a mammal, most suitably a human.

Spray Drying

Spray drying is a method for producing a dehydrated powder from a liquid feed. Spray drying is extensively used in food and in pharmaceutical industries. Drying commonly describes the process of thermally removing volatile substances (moisture) to obtain a solid product. Drying of various feedstocks is needed for the following reasons: preservation and storage, reduction in cost of transportation and achieving desired quality of product.

The spray drying step of the process may be performed using a range of apparatus designs and operating conditions. The optimal operating conditions may depend on the precise design of the apparatus chosen.

The steps of spray drying may include: liquid feed atomization, droplet drying, powder collection and subsequent processing. The atomization of the feed can be achieved using a number of methods. While rotary, vibrating orifice and electrostatic spray methods have been used, the primary nebulization method for spray drying pharmaceutical products utilizes the two-fluid nozzle. In this process, the flow of the liquid feed and a pressurized nebulizing fluid are mixed and forced to exit a nozzle, at which point the rapid decompression of the fluids and engineered dispersal of the liquid stream result in the atomization of the liquid, converting it into a spray of droplets. The properties of the liquid droplets can be adjusted to particular product specifications by changing the properties of the liquid feed (e.g., feed concentration, solvents or surface tension), the nature of the nebulizing fluid and the engineering of the spray nozzle. Atomisation aims to achieve the optimal droplet size.

Atomisation may be achieved by rotating wheel, cyclone and/or rotating nozzle. Given that they will affect the potentially damaging shear forces that the liquid composition will be exposed to during the process, the atomization parameters also need to be controlled. The droplets are dispersed into a drying environment that typically consists of a heated, dry, inert gas. Exposure of the material to the drying environment is controlled by the drying chamber, which can be designed to introduce the feed spray into a concurrent or countercurrent flow of drying gas. The drying gas is then filtered, dehumidified and returned to the drying chamber in a closed system. The gas may also be filtered and released to the outer environment in an open system. The temperature of the drying environment in relation to the enthalpy of solvent evaporation is critical for creating a dry product. As the droplets dry, the dissolved/suspended material concentrates until saturation, at which point a solid layer may form around the remaining feed liquid.

Subsequent drying occurs with the exchange of solvent vapor through the dried outer layer. Due to evaporative cooling, the temperature of the drying droplets will be lower than or equal to the temperature of the surrounding drying gas. The temperature of the drying gas must be controlled so that the vaccine is not exposed to damaging high temperatures.

Once dried, the particles must be collected from the drying environment. Separation of the dry particles from the drying gas can be achieved using particle inertia in a cyclone collector by impaction onto a filter or through electrostatic precipitation. The bulk powder may be further dried on a fluidized bed, coated or encapsulated with additional excipients or blended with other powders. The final vaccine powder can be stored in bulk or repackaged into single or multidose containers.

The advantages of spray drying over lyophilisation are that a controllable, uniform product is produced in a continuous process, freezing is not required, the process is more readily scaled up and versatile product filling options are available. Lyophilisation on the other hand is more time consuming, has high power requirements and requires a large operating space (McAdams et al 2012).

Suitably the maximum temperature experienced by the isolated polysaccharide during the spray drying process is no greater than 200° C., more suitably no greater than 190° C., more suitably no greater than 185° C., more suitably no greater than 180° C.

Suitably the spray dryer has an inlet temperature no greater than 200° C., more suitably no greater than 150° C., more suitably no greater than 130° C., more suitably no greater than 120° C. Suitably the spray dryer has an inlet temperature between 100 and 200° C., more suitably between 110 and 190° C., more suitably between 120 and 170° C.

Suitably the spray dryer has an outlet temperature no greater than 100° C., more suitably no greater than 80° C., more suitably no greater than 70° C., more suitably no greater than 65° C. Suitably the spray dryer has an outlet temperature between 40 and 80° C., more suitably between 45 and 70° C., more suitably between 50 and 65° C.

Suitably, the feed flowrate of the liquid composition in the spray dryer is between 0.1 and 50 L/H, more suitably between 0.3 and 25 L/H, more suitably between 0.5 and 20 L/H, more suitably between 0.8 and 10 L/H.

The skilled person will appreciate that an increase in flow rate and/or turbine rotation speed can compensate for higher inlet and outlet temperatures. These (and other) spray drying parameters can be adjusted to optimise the process so long as a significant proportion of the polysaccharide remains undamaged during processing.

Suitably, the process does not require a precipitation step. Many processes of the prior art require a precipitation step to purify polysaccharides before drying, which requires significant quantities of solvent. The use of the spray-drying step in the present invention negates the need of a precipitation step, resulting in a much lower consumption of solvent during the new process compared to the previous processes.

Suitably, the process does not require a precipitation step. Many processes of the prior art require a precipitation step to purify polysaccharides before drying, which requires significant quantities of solvent such as alcohol. Quantities of this alcohol may remain in the dried polysaccharide as a contaminant.

According to the present invention, it has been surprisingly found that low concentration polysaccharide solutions may be used in effective spray drying methods. Suitably, the concentration of polysaccharide in the liquid composition is between 0.01 and 20 g/L, more suitably between 0.1 and 15 g/L, more suitably between 0.5 and 13 g/L, more suitably 0.7 and 11 g/L, more suitably between 0.9 and 10 g/L.

In one embodiment, the process of the invention comprises the step of filtering the composition comprising the isolated polysaccharide (suitably by ultrafiltration) before the step of spray drying the liquid composition comprising the isolated polysaccharide. More suitably, the process comprises the step of clarifying the composition comprising the isolated polysaccharide before performing the steps above. More suitably, the filtration step above comprises or more suitably consists of concentration, $1^{st}$ diafiltration, $2^{nd}$ diafiltration and rinsing steps.

In a further embodiment, the process of the invention comprises the step of filtering the composition comprising the isolated polysaccharide (suitably by ultrafiltration) followed by clarification, followed by filtration (suitably ultrafiltration), followed by further filtration (suitably ultrafiltration), followed by further clarification, followed by further filtration (suitably ultrafiltration), followed by spray drying the liquid composition comprising the isolated polysaccharide.

Suitably, preceding the steps above the process of the invention comprises the steps of fermentation to produce polysaccharide, followed by inactivation.

Clauses

Clauses describing some particular embodiments of the invention are as follows:

1. A process for drying an isolated polysaccharide comprising the step of spray drying a liquid composition comprising the isolated polysaccharide.

2. The process according to clause 1 wherein the isolated polysaccharide is an isolated capsular polysaccharide.

3. The process according to clause 2 wherein the isolated capsular polysaccharide is an antigen.

4. The process according to either clause 2 or 3 wherein the isolated capsular polysaccharide is derived from Gram-positive bacteria.

5. The process according to clause 4 wherein the isolated capsular polysaccharide is derived from *Streptococcus* bacteria.

6. The process according to clause 5 wherein the bacteria are of the species group B *Streptococcus* or *Streptococcus pneumoniae*.

7. The process according to clause 6 wherein the bacteria are of the species *Streptococcus pneumoniae*.

8. The process according to clause 7, wherein the bacteria are of *Streptococcus pneumoniae* serotype 1, 4, 5, 6B, 7F, 9V, 14, 18C, 19F or 23F.

9. The process according to clause 7, wherein the isolated capsular polysaccharide is PS 1, 4, 5, 6B, 7F, 9V, 14, 18C, 19F or 23F.

10. The process according to any one of clauses 1 to 9 wherein the liquid composition comprises less than 1% (w/w) protein.

11. The process according to clause 10 wherein the liquid composition does not comprise any protein.

12. The process according to any one of clauses 1 to 11 wherein the liquid composition comprises less than 1% (w/w) protectants.

13. The process according to clause 12 wherein the liquid composition does not comprise any protectants.

14. The process according to any one of clauses 1 to 13 wherein the isolated polysaccharide is at least 99% (w/w) pure.

15. The process according to any one of clauses 1 to 14 wherein the spray drying step has a feed flowrate between 0.3 and 25 L/H.

16. The process according to any one of clauses 1 to 15 wherein the spray dryer used in the spray drying step has an inlet temperature between 110 and 190° C.

17. The process according to any one of clauses 1 to 16 wherein the spray dryer used in the spray drying step has an outlet temperature between 45 and 70° C.

18. The process according to any one of clauses 1 to 17 wherein concentration of polysaccharide in the liquid composition is between 0.5 and 13 g/L.

19. The processing according to any one of clauses 1 to 18 wherein the viscosity of the liquid composition is 15 to 95 cP.

20. The process according to any one of clauses 1 to 19 wherein the process further comprises at least one filtration step before the spray drying step.

21. The process according to any one of clauses 1 to 20 wherein the liquid composition is filtered before being spray dried.

22. The process according to clause 21 wherein the liquid composition is filtered by tangential flow filtration.

23. The process according to either clause 21 or 22 wherein the liquid composition is filtered at least twice before being spray dried.

24. The process according to any one of clauses 1 to 23 wherein the process does not include a flocculation step.

25. The process according to any one of clauses 1 to 23 wherein the process does not include a precipitation step.

26. The process according to any one of clauses 1 to 23 wherein the liquid composition is not treated with alcohol.

27. An isolated polysaccharide obtainable or obtained by the process according to any one of clauses 1 to 26.

28. A conjugate comprising the isolated polysaccharide of clause 27.

29. The conjugate of clause 28, wherein the polysaccharide is conjugated to a protein.

30. The conjugate of clause 29, wherein the isolated polysaccharide is conjugated to a protein by an ADH (adipic acid dihydrazide) linker.

31. A pharmaceutical composition comprising the isolated polysaccharide or conjugate of any one of clauses 1 to 30 and a pharmaceutically acceptable excipient.

32. An immunogenic composition comprising the isolated polysaccharide or conjugate of any one of clauses 1 to 30 and an immunostimulant.

33. The isolated polysaccharide, conjugate or composition according to any one of clauses 1 to 32 for use as a medicament.

34. The isolated polysaccharide, conjugate or composition according to clause 33 for use in the treatment or prevention of bacterial infection.

35. Use of the isolated polysaccharide, conjugate or composition according to any one of clauses 1 to 32 in the manufacture of a medicament for the treatment or prevention of bacterial infection.

36. A method for treatment or prevention of bacterial infection comprising administering the isolated polysaccharide, conjugate or composition according to any one of clauses 1 to 30 to a subject.

37. The isolated polysaccharide, conjugate or composition for use, the use, or the method according to any one of clauses 33 to 36 wherein the bacterial infection is caused by a bacterium belonging to the *Streptococcus* genus.

38. The isolated polysaccharide, conjugate or composition for use, the use, or the method according to clause 37 wherein the bacterial infection is caused by a bacterium belonging to the group B *Streptococcus* or *Streptococcus pneumoniae* species.

39. The isolated polysaccharide, conjugate or composition for use, the use, or the method according to clause 38 wherein the bacterial infection is caused by a bacterium belonging to the *Streptococcus pneumoniae* species.

40. Use of a spray dryer for drying an isolated polysaccharide in a liquid composition comprising the isolated capsular polysaccharide.

Further Clauses

Further clauses describing some particular embodiments of the invention are as follows:

1. A process for drying an isolated polysaccharide comprising the step of spray drying a liquid composition comprising the isolated polysaccharide.

2. The process according to clause 1 wherein the isolated polysaccharide is an isolated capsular polysaccharide.

3. The process according to clause 2 wherein the isolated capsular polysaccharide is an antigen.

4. The process according to either clause 2 or 3 wherein the isolated capsular polysaccharide is derived from Gram-positive bacteria.

5. The process according to clause 4 wherein the isolated capsular polysaccharide is derived from *Streptococcus* bacteria.

6. The process according to clause 5 wherein the bacteria are of the species group B *Streptococcus* or *Streptococcus pneumoniae*.

7. The process according to clause 6 wherein the bacteria are of the species *Streptococcus pneumoniae*.

8. The process according to clause 7, wherein the bacteria are of *Streptococcus pneumoniae* serotype 1, 4, 5, 6B, 7F, 9V, 14, 18C, 19F or 23F.

9. The process according to clause 7, wherein the isolated capsular polysaccharide is PS 1, 4, 5, 6B, 7F, 9V, 14, 18C, 19F or 23F.

10. The process according to clause 6 wherein the bacteria are of the species *Streptococcus agalactiae*.

11. The process according to clause 10, wherein the bacteria are of *Streptococcus agalactiae* (GBS) serotype Ia, Ib, II, III, IV or V.

12. The process according to clause 11, wherein the isolated capsular polysaccharide is PS Ia, Ib, II, III, IV or V.

13. The process according to any one of clauses 1 to 12 wherein the liquid composition comprises less than 1% (w/w) protein.

14. The process according to clause 13 wherein the liquid composition does not comprise any protein.

15. The process according to any one of clauses 1 to 14 wherein the liquid composition comprises less than 1% (w/w) protectants.

16. The process according to clause 15 wherein the liquid composition does not comprise any protectants.

17. The process according to any one of clauses 1 to 16 wherein the isolated polysaccharide is at least 99% (w/w) pure.

18. The process according to any one of clauses 1 to 17 wherein the spray drying step has a feed flowrate between 0.3 and 25 L/H.

19. The process according to any one of clauses 1 to 18 wherein the spray dryer used in the spray drying step has an inlet temperature between 110 and 190° C.

20. The process according to any one of clauses 1 to 19 wherein the spray dryer used in the spray drying step has an outlet temperature between 45 and 70° C.

21. The process according to any one of clauses 1 to 20 wherein concentration of polysaccharide in the liquid composition is between 0.5 and 13 g/L.

22. The processing according to any one of clauses 1 to 21 wherein the viscosity of the liquid composition is 15 to 95 cP.

23. The process according to any one of clauses 1 to 22 wherein the process further comprises at least one filtration step before the spray drying step.

24. The process according to any one of clauses 1 to 23 wherein the liquid composition is filtered before being spray dried.

25. The process according to clause 24 wherein the liquid composition is filtered by tangential flow filtration.

26. The process according to either clause 24 or 25 wherein the liquid composition is filtered at least twice before being spray dried.

27. The process according to any one of clauses 1 to 26 wherein the process does not include a flocculation step.

28. The process according to any one of clauses 1 to 26 wherein the process does not include a precipitation step.

29. The process according to any one of clauses 1 to 26 wherein the liquid composition is not treated with alcohol.

30. The process according to any one of clauses 1 to 29 wherein the liquid composition comprises an isolated capsular polysaccharide and less than 1% (w/w), such as less than 0.5% (w/w), such as less than 0.2% (w/w), such as less than 0.1% (w/w), such as less than 0.05% (w/w), such as less than 0.01% (w/w) carbohydrates other than the isolated polysaccharide.

31. The process according to clause 30 wherein the liquid composition comprises no carbohydrates other than the isolated capsular polysaccharide.

32. The process according to any one of clauses 1 to 29 wherein the liquid composition comprises an isolated capsular polysaccharide and is free of carbohydrates other than the isolated capsular polysaccharide.

33. The process according to any one of clauses 1 to 29 wherein the liquid composition comprises an isolated capsular polysaccharide and does not comprise carbohydrates other than the isolated capsular polysaccharide.

34. The process according to any one of clauses 1 to 29 wherein the liquid composition comprises an isolated capsular polysaccharide and does not comprise an excipient.

35. The process according to any one of clauses 1 to 29 wherein the liquid composition comprises an isolated capsular polysaccharide and, other than the isolated capsular polysaccharide, does not comprise carbohydrates, monosaccharides, disaccharides, cyclodextrins, polysaccharides, starch, cellulose, salts, sodium phosphates, calcium phosphates, calcium sulfate, magnesium sulfate, citric acid, tartaric acid, glycine, polyethylene glycols (PEG's), pluronics or surfactants.

36. The process according to any one of clauses 1 to 29 wherein the liquid composition comprises an isolated capsular polysaccharide and does not comprise an excipient as defined in US 2005/0266011.

37. The process according to any one of clauses 1 to 29 wherein the liquid composition comprises one polysaccharide, wherein the polysaccharide is an isolated capsular polysaccharide.

38. The process according to any one of clauses 1 to 29 wherein the liquid composition comprises one polysaccharide, wherein the polysaccharide is an isolated capsular polysaccharide and wherein this polysaccharide is the only polysaccharide present in the liquid composition.

39. The process according to any one of clauses 1 to 29 wherein the liquid composition consists essentially of solvent and an isolated capsular polysaccharide. In one embodiment the liquid composition consists essentially of water and an isolated capsular polysaccharide.

40. The process according to any one of clauses 1 to 29 wherein the liquid composition consists of water and an isolated capsular polysaccharide.

41. An isolated polysaccharide obtainable or obtained by the process according to any one of clauses 1 to 40.

42. A conjugate comprising the isolated polysaccharide of clause 41.

43. The conjugate of clause 42, wherein the polysaccharide is conjugated to a protein.

44. The conjugate of clause 43, wherein the isolated polysaccharide is conjugated to a protein by an ADH (adipic acid dihydrazide) linker.

45. A pharmaceutical composition comprising the isolated polysaccharide or conjugate of any one of clauses 1 to 44 and a pharmaceutically acceptable excipient.

46. An immunogenic composition comprising the isolated polysaccharide or conjugate of any one of clauses 1 to 44 and an immunostimulant.

47. The isolated polysaccharide, conjugate or composition according to any one of clauses 1 to 46 for use as a medicament.

48. The isolated polysaccharide, conjugate or composition according to clause 47 for use in the treatment or prevention of bacterial infection.

49. Use of the isolated polysaccharide, conjugate or composition according to any one of clauses 1 to 46 in the manufacture of a medicament for the treatment or prevention of bacterial infection.

50. A method for treatment or prevention of bacterial infection comprising administering the isolated polysaccharide, conjugate or composition according to any one of clauses 1 to 46 to a subject.

51. The isolated polysaccharide, conjugate or composition for use, the use, or the method according to any one of clauses 48 to 50 wherein the bacterial infection is caused by a bacterium belonging to the *Streptococcus* genus.

52. The isolated polysaccharide, conjugate or composition for use, the use, or the method according to clause 40 wherein the bacterial infection is caused by a bacterium belonging to the group B *Streptococcus* or *Streptococcus pneumoniae* species.

53. The isolated polysaccharide, conjugate or composition for use, the use, or the method according to clause 52 wherein the bacterial infection is caused by a bacterium belonging to the *Streptococcus pneumoniae* species.

In order that this invention may be better understood, the following examples are set forth. These examples are for purposes of illustration only, and are not to be construed as limiting the scope of the invention in any manner.

Examples

Ten aqueous solutions were prepared, each comprising one different *Streptococcus pneumoniae* polysaccharide. These solutions were filtered and concentrated by tangential flow filtration and then spray dried.

An established drying process for these polysaccharides involves ethanol precipitation followed by filtration in order to recover the polysaccharide as a pellet which is vacuum dried. The objectives of these experiments were to produce dried polysaccharide in powder form using spray drying which met required specification and to obtain a yield comparable with that of this established drying process.

The examples below provide both yield-optimisation studies and comparison with the established dried polysaccharide specification parameters. For yield-optimisation work, polysaccharide powder sourced from the established process was dissolved in water to achieve desired concentration before undergoing spray drying. For comparison with the established dried polysaccharide specification parameters, an aliquot of 3 litres of sample from the $2^{nd}$ celite eluate step of the established process was taken and this aliquot was spray dried to obtain a powder for analysis.

"$2^{nd}$ celite eluate (E2CI)" refers to the percentage of the total solution taken from the celite filtration step for further testing. The spraydrying procedure was of a lower scale than the established precipitation method. Accordingly, the percentage of total solution taken when spraydrying is always lower than that taken when using the established precipitation method and therefore the collected product may be expected to be lower.

The most important parameters in these investigations are yield, water content and integrity of the polysaccharide after drying.

Techniques Used in the Examples Below

HPSEC

HPSEC (%) refers to the High Pressure Size Exclusion Chromatography procedure performed on samples to ascertain the percentage of intact polysaccharide recovered in the process. Two different columns were used (TSKgel G5000 PWXL and Tosoh GMPWXL) each with refractive index detectors. The refractive index variations are directly related to a solution concentration. Thus elution time and resistance bridge output signals the relative abundance of molecules of a particular size.

The MSD is evaluated by measuring the ratio:

$$\frac{\text{peaks \textit{suface} before retention time of the dextran cut off}}{\text{total peaks \textit{suface}}} \times 100$$

NMR

NMR is used in the examples below to determine the content of particular functional groups present in the polysaccharides, including o-acetyl, uronic acid, hexosamine and methylpentose. Such analysis is in line with QC release tests for polysaccharides for vaccine use. The table below lists the functional groups investigated via NMR for each purified bulk polysaccharide.

| Product | | Product | |
|---|---|---|---|
| Purified bulk PS1 | Identity | Purified bulk PS9V | Identity |
| | o-Acetyl | | o-Acetyl |
| | Uronic acid | | Hexosamine |
| Purified bulk PS4 | Identity | | Uronic acid |
| | Hexosamine | Purified bulk PS14 | Identity |
| Purified bulk PS5 | Identity | | Hexosamine |
| | Hexosamine | Purified bulk PS18C | Identity |
| | Uronic acid | | Methylpentose |
| Purified bulk PS6B | Identity | | o-Acetyl |
| | Methylpentose | Purified bulk PS19F | Identity |
| Purified bulk PS7F | Identity | | Hexosamine |
| | Methylpentose | | Methylpentose |
| | o-Acetyl | Purified bulk PS23F | Identity |
| | | | Methylpentose |

Karl Fisher

Karl Fisher is an analytical technique used to measure the water content in a sample. The Karl-Fisher titration involves two reactions. In the first reaction an alcohol (methanol), sulfure dioxide and a base react to form an alkylsulphite intermediate. Secondly, this alkylsulphite reacts with iodine and the water content in the sample (oxidation reaction).

Water and iodine are consumed in equimolar amounts, if the amount of iodine consumed is known; this allows quantification of the amount of water present in the sample:

$$CH_3OH+SO_2+RN \leftrightarrow [RNH]SO_3CH_3 \quad (1)$$

$$[RNH]SO_3CH_3+I_2+2\ RN+H_2O \leftrightarrow [RNH]SO_4CH_3+2\ [RNH]I \quad (2)$$

$$\text{electrochemically produced } 2I^- \rightarrow I_2+2e^- \quad (3)$$

MALLS

Static light scattering is a technique to measure the molecular weight using the relationship between the intensity of light scattered by a molecule and its molecular weight and size. When a photon (incident beam) strikes a molecule, some of the energy from the photon is used to initiate an oscillating dipole within the molecule. This energy is subsequently re-emitted by the molecule in all directions as light. The relationships are described by Rayleigh theory saying that the molecular weight of a molecule is proportional to the Rayleigh ratio of scattered light. Another factor, the angular dependence (size of the molecule) also affects the intensity of the scattered light. One commonly used values of molecular size (in static light scattering) is the radius of gyration ($R_g$).

The Rayleigh equation is:

$$\frac{KC}{R_\theta} = \left(\frac{1}{Mw} + 2A_2 C\right)\frac{1}{P_\theta} \quad \text{(eq. 1)}$$

Where:
C=sample concentration
θ=the measurement angle
$R_\theta$=the Rayleigh ratio (ratio of scattered light intensity to incident light intensity) at the measurement angle θ.

Mw=molecular weight

A$_2$=the second virial coefficient

K and P$_\theta$ sare more complex terms;

$$K = \frac{4\pi^2}{\lambda_o^4 N_A}\left(n_0 \frac{dn}{dc}\right)^2 \qquad \text{(eq. 2)}$$

Where:

$\lambda_0$=laser wavelength in a vacuum $N_A$=Avogadro's number $n_0$=refractive index of the solvent $\frac{dn}{dc}$ = refractive index increment of the sample And finally:

$$\frac{1}{p_\theta} = 1 + \frac{16\pi^2 n_0^2 R_g^2}{3\lambda_0^2}\sin^2\left(\frac{\theta}{2}\right) \qquad \text{(eq. 3)}$$

Where R$_g$=molecule's radius gyration.

A multi angles laser light spectroscopy (MALLS or MALS) is a detector that collects scattered light at many angles. This technique can be used as a part of the SEC chromatography (detector) and permit determination of the molecular weight of the analyte analysed. With the multi angle scattering data the radius of gyration can be calculated to give the size of molecules. By plotting all this data of intensity of light at different angles on a Guinier plot, a best fit line can be extrapolated back to 0° from where the molecular weight can be calculated. The initial slope of this line enables an accurate calculation of molecular size, R$_g$. A plot is completed and extrapolated back to 0°. The molecular weight is calculated from the intercept and R$_g$ is calculated from the initial slope of the line Water Content by Gravimetric Method Moisture content is one of the most commonly measured properties of a powder after spray drying. In this study, a Halogen Moisture Analyzer METTLER TOLEDO HG53 was used. The instrument works on the thermogravimetric principle: at the start of the measurement the Moisture Analyzer determines the weight of the sample, the sample is then quickly heated by the integral halogen heating module and the moisture vaporizes. During the drying process the instrument continually measures the weight of the sample and displays the reduction in moisture. Once drying has been completed, the moisture or solids content of the sample is displayed as the final result.

Example 1—PS 1

Experiments were performed with dissolved PS 1 which showed that yield may be increased by adjusting spray drying parameters. The conditions used in the subsequent experiment and summarized in the table below improved final powder in terms of yield, water content and powder fluidity. It was found that by varying certain parameters the spraydrying yield was increased by 17%.

|  | Initial experiment | Subsequent experiment |
| --- | --- | --- |
| Sprayed volume (L) | 1.5 | 2.0 |
| Viscosity (cP) | 110 | 50 |
| T° C. in/out | 190/85 | 160/80 |
| Solids content (%) | 1.10 | 0.45 |
| Feed flowrate (L/H) | 1.0 | 0.5 |
| Spraydrying yield (%) | 44 | 61 |
| Water content by gravimetric method (%) | 11.0 | 10.5 |

A further experiment was performed using PS 1. A solution comprising PS 1 was spray dried according to the following parameters.

| Sprayed volume (L) | 1.4 |
| --- | --- |
| Viscosity (cP) | 55 |
| T° C. in/out | 160/80 |
| Feed flowrate (L/H) | 0.5 |

A fluid powder was produced. After the end of the test the drying chamber was inspected and only few deposits were observed. The powder was characterized and compared with the powder obtained after the established process of precipitation/drying. The results are provided below.

|  |  | PS1 | | |
| --- | --- | --- | --- | --- |
|  |  | Precipitation | Spraydrying | Specification |
| 2$^{nd}$ celite eluate (E2Cl) |  | 95% | 5% | — |
| Collected product (g) |  | 66.5 | 2.2 | — |
| Yield (g/L E2Cl) |  | 1.07 | 0.63 |  |
| H$_2$O content by μKarl Fisher (% dry weight) |  | 5.9 | 10.4 | <15% |
| EtOH content by spectrophotometry (% dry weight) |  | 3.2 | 0.0 | <10% |
| Molecular size distribution (MSD) by HPSEC (%) |  | 96 | 94 | ≥70% |
| H-NMR | O acetyl (%) | 3.1 | 5.5 | — |
|  | Uronic acid (%) | 53.9 | 62.8 | — |

In summary, the powders produced by each method demonstrated similar properties. The spray dried polysaccharide met specification parameters.

A subsequent experiment performed with dissolved PS 1 has shown that integrity of the polysaccharide was conserved after the spraydrying trial. The results are provided below.

|  | Precipitation | Spraydrying |
| --- | --- | --- |
| T° C. in/out | NA | 190/85 |
| HPSEC MALLS (kDa) | 703 | 714 |
| Rw (root mean square radius of polysaccharide, nm) | 61.8 | 59.5 |
| Mw/Mn (polydispersity) | 1.199 | 1.219 |

Example 2—PS 4

Experiments were performed with dissolved PS 4 which showed that yield may be increased by adjusting spray drying parameters. The conditions used in the subsequent experiment and summarized in the table below improved final powder in terms of yield, water content and powder fluidity. It was found that, by decreasing the polysaccharide concentration in the feeding solution the spraydrying yield was increased by 23%.

|  | Initial experiment | Subsequent experiment |
|---|---|---|
| Sprayed volume (L) | 2.8 | 1.4 |
| Viscosity (cP) | / | 50 |
| T° C. in/out | 160/80 | 160/80 |
| Solids content (%) | 0.6 | 0.36 |
| Feed flowrate (L/H) | 0.5 | 0.5 |
| Spraydrying yield (%) | 71 | 92 |
| Water content by gravimetric method (%) | 10.0 | 9.5 |

A further experiment was performed using PS 4. A solution comprising PS 4 was spray dried according to the following parameters.

| Sprayed volume (L) | 1.39 |
|---|---|
| Viscosity (cP) | 60 |
| T° C. in/out | 160/80 |
| Feed flowrate (L/H) | 0.5 |

A fluid powder was produced. After the end of the test the drying chamber was inspected and only few deposits were observed. The powder was characterized and compared with the powder obtained after the established process of precipitation/drying. The results are

| PS4 | | | |
|---|---|---|---|
|  | Precipitation | Spraydrying | Specification |
| $2^{nd}$ celite eluate (E2Cl) | 95% | 5% | — |
| Collected product (g) | 141 | 4.8 | — |
| Yield (g/L E2Cl) | 2.3 | 1.4 | — |
| H₂O content by μKarl Fisher (% dry weight) | 3.1 | 8.7 | <15% |
| EtOH content by spectrophotometry (% dry weight) | 4.5 | 0.0 | <10% |
| MSD by HPSEC (%) | 91 | 91 | ≥70% |
| H-NMR Hexosamine (%) | 64.1 | 66.5 | — |
| H-NMR Pyruvic acid (%) | 8.2 | 7.6 | — |

In summary, the powders produced by each method demonstrated similar properties. High yield was achieved and the spray dried polysaccharide met specification parameters.

A subsequent experiment performed with dissolved PS 4 has shown that integrity of the polysaccharide was conserved after the spraydrying trial. The results are provided below.

|  | Precipitation | Spraydrying |
|---|---|---|
| T° C. in/out | NA | 190/85 |
| HPSEC MALLS (kDa) | 364 | 344 |
| Rw (nm) | 56.9 | 55.0 |
| Mw/Mn | 1.230 | 1.244 |

Example 3—PS 5

Experiments were performed with dissolved PS 5 which showed that yield may be increased by adjusting the spray drying parameters. The conditions used in the subsequent experiment and summarized in the table below improved the final powder in terms of yield, water content and powder fluidity. It was found that by decreasing the polysaccharide concentration in the feeding solution the spraydrying yield was increased by 24%.

|  | Initial experiment | Subsequent experiment |
|---|---|---|
| Sprayed volume (L) | 0.4 | 2.5 |
| Viscosity (cP) | 75 | — |
| T° C. in/out | 160/80 | 160/80 |
| Solids content (%) | 1.0 | 0.4 |
| Feed flowrate (L/H) | 0.5 | 0.7 |
| Spraydrying yield (%) | 60 | 84 |
| Water content by gravimetric method (%) | 10.0 | 7.3 |

A further experiment was performed using PS 5. A solution comprising PS 5 was spray dried according to the following parameters.

| Sprayed volume (L) | 1.63 |
|---|---|
| Viscosity (cP) | 40 |
| T° C. in/out | 160/80 |
| Feed flowrate (L/H) | 0.5 |

A fluid powder was produced. After the end of the test the drying chamber was inspected and only few deposits were observed. The powder was characterized and compared with the powder obtained after the established process of precipitation/drying. The results are provided below.

| PS5 | | | |
|---|---|---|---|
|  | Precipitation | Spraydrying | Specification |
| $2^{nd}$ celite eluate (E2Cl) | 95% | 5% | — |
| Collected product (g) | 53.2 | 1.4 | — |
| Yield (g/L E2Cl) | 0.9 | 0.4 | — |
| H₂O content by μKarl Fisher (% dry weight) | 2.3 | 9.3 | <15% |
| EtOH content by spectrophotometry (% dry weight) | 7.7 | 0.0 | <10% |

-continued

| PS5 | | | |
|---|---|---|---|
| | Pre-cipitation | Spraydrying | Specification |
| MSD by HPSEC (%) | 83 | 85 | ≥52% |
| H-NMR Hexosamine (%) | 55.5 | 53.0 | — |
| Uronic acid (%) | 21.7 | 23.2 | — |

In summary, the powders produced by each method demonstrated similar properties. The spray dried polysaccharide met specification parameters.

A subsequent experiment performed with dissolved PS 5 has shown that integrity of the polysaccharide was conserved after the spraydrying trial. The results are provided below.

| | Precipitation | Spraydrying |
|---|---|---|
| T° C. in/out | / | 140/160 |
| HPSEC MALLS (kDa) | 364 | 368 |
| Rw (nm) | 48.6 | 46.3 |
| Mw/Mn | 1.241 | 1.267 |

Example 4—PS 6B

Experiments were performed with dissolved PS 6B which showed that yield may be increased by adjusting the spray drying parameters. The conditions used in the subsequent experiment and summarized in the table below improved final powder in terms of yield, water content and powder fluidity. It was found that, by decreasing the polysaccharide concentration in the feeding solution, the spraydrying yield was increased by 10%.

| | Initial experiment | Subsequent experiment |
|---|---|---|
| Sprayed volume (L) | 1.3 | 1.9 |
| Viscosity (cP) | NA | 65 |
| T° C. in/out | 190/85 | 190/85 |
| Solids content (%) | 1.1 | 0.5 |
| Feed flowrate (L/H) | 1.0 | 0.9 |
| Spraydrying yield (%) | 50 | 60 |
| Water content by gravimetric method (%) | 10.2 | 8.1 |

A further experiment was performed using PS 6B. A solution comprising PS 6B was spray dried according to the following parameters.

| Sprayed volume (L) | 1.7 |
|---|---|
| Viscosity (cP) | 80 |
| T° C. in/out | 160/80 |
| Feed flowrate (L/H) | 0.4 |

A fluid powder was produced. After the end of the test the drying chamber was inspected and only few deposits were observed. The powder was characterized and compared with the powder obtained after the established process of precipitation/drying. The results are

| PS6B | | | |
|---|---|---|---|
| | Pre-cipitation | Spraydrying | Specification |
| 2nd celite eluate (E2Cl) | 90% | 5% | — |
| Collected product (g) | 138 | 4.3 | — |
| Yield (g/L E2Cl) | 2.4 | 1.3 | — |
| H$_2$O content by μKarl Fisher (% dry weight) | 3.3 | 5.6 | <15% |
| EtOH content by spectrophotometry (% dry weight) | 3.8 | 0.0 | <10% |
| MSD by HPSEC (%) | 73 | 74 | ≥50% |
| H-NMR Methylpentose (%) | 21.3 | 18.1 | |

In summary, the powders produced by each method demonstrated similar properties. The spray dried polysaccharide met specification parameters.

A subsequent experiment performed with dissolved PS 6B has shown that integrity of the polysaccharide was conserved after the spraydrying trial. The results are provided below.

| | Precipitation | spraydrying |
|---|---|---|
| T° C. in/out | NA | 190/85 |
| HPSEC MALLS (kDa) | 1330 | 1226 |
| Rw (nm) | 59.0 | 58.3 |
| Mw/Mn | 1.179 | 1.198 |

Example 5—PS 9V

Experiments were performed with dissolved PS 9V which showed that yield may be increased by adjusting the spray drying parameters. The conditions used in the subsequent experiment and summarized in the table below improved final powder in terms of yield, water content and powder fluidity. It was found that, by decreasing the polysaccharide concentration in the feeding solution, the spraydrying yield was increased by 25%.

| | Initial experiment | Subsequent experiment | Subsequent experiment |
|---|---|---|---|
| Sprayed volume (L) | 1.5 | 1.5 | 2.6 |
| Viscosity (cP) | 110 | 70 | — |
| T° C. in/out | 190/85 | 160/80 | 160/80 |
| Solids content (%) | 1.1 | 0.5 | 0.6 |
| Feed flowrate (L/H) | 0.9 | 0.5 | 0.5 |
| Spraydrying yield (%) | 41 | 66 | 62 |
| Water content by gravimetric method (%) | 9.4 | 10.1 | 7.6 |

A further experiment was performed using PS 9V. A solution comprising PS 9V was spray dried according to the following parameters.

| | |
|---|---|
| Sprayed volume (L) | 1.3 |
| Viscosity (cP) | 60 |
| T° C. in/out | 160/80 |
| Feed flowrate (L/H) | 0.5 |

A fluid powder was produced. After the end of the test the drying chamber was inspected and only few deposits were observed. The powder was characterized and compared with the powder obtained after the established process of precipitation/drying. The results are

| PS9V | | | | |
|---|---|---|---|---|
| | | Precipitation | Spraydrying | Specification |
| $2^{nd}$ celite eluate (E2Cl) | | 95% | 5% | — |
| Collected product (g) | | 199.5 | 1.9 | — |
| Yield (g/L E2Cl) | | 3.2 | 0.8 | |
| $H_2O$ content (% dry weight) | | 3.0 | 8.8 | <15% |
| EtOH content (% dry weight) | | 5.3 | 0.0 | <10% |
| HPSEC (%) | | 82 | 80 | ≥55% |
| H-NMR | Hexosamine (%) | 21.5 | 22.4 | — |
| | Uronic acid (%) | 19.0 | 19.8 | — |

In summary, the powders produced by each method demonstrated similar properties.

A subsequent experiment performed with dissolved PS 9V has shown that integrity of the polysaccharide was conserved after the spraydrying trial. The results are provided below.

| | Precipitation | Spraydrying |
|---|---|---|
| T° C. in/out | NA | 190/85 |
| HPSEC MALLS (kDa) | 1409 | 1410 |
| Rw (nm) | 73.6 | 72.4 |
| Mw/Mn | 1.241 | 1.226 |

Example 6—PS 18C

Experiments were performed with dissolved PS 180 which showed that yield may be increased by adjusting the spray drying parameters. The conditions used in the subsequent experiment and summarized in the table below improved final powder in terms of yield, water content and powder fluidity. It was found that by varying certain parameters the spraydrying yield was increased by 48%.

| | Initial experiment | Subsequent experiment |
|---|---|---|
| Sprayed volume (L) | 1.0 | 3.2 |
| Viscosity (cP) | — | 50 |
| T° C. in/out | 200/85 | 160/80 |
| Solids content (%) | 1.7 | 0.3 |
| Feed flowrate (L/H) | 1.0 | 0.5 |
| Spraydrying yield (%) | 20 | 71 |
| Water content by gravimetry (%) | 13.3 | 8.5 |

A further experiment was performed using PS 180. A solution comprising PS 180 was spray dried according to the following parameters.

| | |
|---|---|
| Sprayed volume (L) | 0.8 |
| Viscosity (cP) | 60 |
| T° C. in/out | 160/80 |
| Feed flowrate (L/H) | 0.4 |

A fluid powder was produced. After the end of the test the drying chamber was inspected and only few deposits were observed. The powder was characterized and compared with the powder obtained after the established process of precipitation/drying. The results are provided below.

| PS18C | | | | |
|---|---|---|---|---|
| | | Precipitation | Spraydrying | Specification |
| $2^{nd}$ celite eluate (E2Cl) | | 90% | 10% | — |
| Collected product (g) | | 30 | 1.6 | — |
| Yield (g/L E2Cl) | | 0.55 | 0.23 | — |
| $H_2O$ content (% dry weight) | | 2.9 | 6.6 | <15% |
| EtOH content (% dry weight) | | 1.0 | 0.0 | <10% |
| HPSEC (%) | | 80 | 77 | ≥65% |
| H-NMR | Methylpentose (%) | 12.9 | 13.7 | — |
| | O acetyl (%) | 3.4 | 3.4 | — |

In summary, the powders produced by each method demonstrated similar properties. The spray dried polysaccharide met specification parameters.

A subsequent experiment performed with dissolved PS 9V has shown that integrity of the polysaccharide was conserved after the spraydrying trial. The results are provided below.

| | Precipitation | spraydrying |
|---|---|---|
| T° C. in/out | NA | 220/95 |
| HPSEC MALLS (kDa) | 574 | 582 |
| Rw (nm) | 64.8 | 65.0 |
| Mw/Mn | 1.102 | 1.098 |

Example 7—PS 19F

Spray drying experiments were performed with dissolved PS 19F. The conditions used in the experiments are summarized in the table below.

|  | Initial experiment | Subsequent experiment |
| --- | --- | --- |
| Sprayed volume (L) | 3.3 | 0.9 |
| Viscosity (cP) | — | — |
| T° C. in/out | 120/50 | 120/55 |
| Solids content (%) | 0.5 | 0.9 |
| Feed flowrate (L/H) | 0.5 | 0.5 |
| Spraydrying yield (%) | 49 | 48 |
| Water content by gravimetry (%) | 12.1 | 12.0 |

A further experiment was performed using PS 19F. A solution comprising PS 19F was spray dried according to the following parameters.

| Sprayed volume (L) | 3.3 |
| --- | --- |
| Viscosity (cP) | — |
| T ° C. in/out | 120/50 |
| Feed flowrate (L/H) | 0.75 |

A fluid powder was produced. The powder was characterized and compared with the powder obtained after the established process of precipitation/drying. The results are provided below.

| PS19F | | Precip- itation | Spray- drying | Specifi- cation |
| --- | --- | --- | --- | --- |
| 2$^{nd}$ celite eluate (E2CI) | | 95% | 5% | — |
| Collected product (g) | | 219 | 6.5 | — |
| Yield (g/L E2CI) | | 3.3 | 1.9 | — |
| H$_2$O content (% dry weight) | | 6.4 | 12.1 | <15% |
| EtOH content (% dry weight) | | 0.9 | 0.0 | <10% |
| HPSEC (%) | | 78 | 82 | ≥55% |
| H-NMR | Methylpentose (%) | 24.5 | 24.5 | — |
|  | Hexosamine (%) | 35.3 | 34.7 | — |

In summary, the powders produced by each method demonstrated similar properties. The spray dried polysaccharide met specification parameters.

A subsequent experiment performed with dissolved PS 19F has shown that integrity of the polysaccharide was conserved after the spraydrying trial. The results are provided below.

|  | Precipitation | spraydrying | |
| --- | --- | --- | --- |
| T ° C. in/out | NA | 190/85 | 120/55 |
| HPSEC MALLS (kDa) | 1103 | 773 | 1040 |
| Rw (nm) | 81.4 | 64.0 | 78.1 |
| Mw/Mn | 1.366 | 1.478 | 1.413 |

Example 8—PS 23F

Experiments were performed with dissolved PS 23F which showed that yield may be increased by adjusting spray drying parameters. The conditions used in the subsequent experiment and summarized in the table below improved final powder in terms of yield, water content and powder fluidity. It was found that by varying parameters the spraydrying yield was increased by 14%.

|  | Initial experiment | Subsequent experiment |
| --- | --- | --- |
| Sprayed volume (L) | 1.5 | 1.9 |
| Viscosity (cP) | — | — |
| T ° C. in/out | 190/85 | 160/75 |
| Solids content (%) | 0.5 | 0.3 |
| Feed flowrate (L/H) | 1.0 | 0.5 |
| Spraydrying yield (%) | 53 | 67 |
| Water content by gravimetry (%) | 8.1 | 6.7 |

A further experiment was performed using PS 23F. A solution comprising PS 23F was spray dried according to the following parameters.

| Sprayed volume (L) | 1.0 |
| --- | --- |
| Viscosity (cP) | 85 |
| T ° C. in/out | 180/60 |
| Feed flowrate (L/H) | 0.5 |

A fluid powder was produced. After the end of the test the drying chamber was inspected and only few deposits were observed. The powder was characterized and compared with the powder obtained after the established process of precipitation/drying. The results are provided below.

| PS23F | | Precip- itation | Spray- drying | Specifi- cation |
| --- | --- | --- | --- | --- |
| 2$^{nd}$ celite eluate (E2CI) | | 95% | 5% | — |
| Collected product (g) | | 113 | 2.7 | — |
| Yield (g/L E2CI) | | 1.7 | 0.8 | — |
| H$_2$O content (% dry weight) | | 4.2 | 5.4 | <15% |
| EtOH content (% dry weight) | | 0.9 | 0.0 | <10% |
| HPSEC (%) | | 82 | 76 | ≥51% |
| H-NMR | Methylpentose (%) | 34.7 | 34.9 | — |

In summary, the powders produced by each method demonstrated similar properties. The spray dried polysaccharide met specification parameters.

A subsequent experiment performed with dissolved PS 23F has shown that the integrity of the polysaccharide was conserved after the spraydrying trial. The results are provided below.

|  | Precipitation | Spraydrying |
| --- | --- | --- |
| T ° C. in/out | / | 190/85 |
| HPSEC MALLS (kDa) | 1249 | 1207 |
| Rw (nm) | 76.4 | 74.5 |
| Mw/Mn | 1.239 | 1.221 |

Example 9—PS 7F

Experiments were performed with dissolved PS 7F which showed that yield may be increased by adjusting spray drying parameters. The conditions used in the subsequent experiment and summarized in the table below improved final powder in terms of yield, water content and powder fluidity. It was found that by varying certain parameters the spraydrying yield was increased by 17%.

|  | Initial experiment | Subsequent experiment |
| --- | --- | --- |
| Sprayed volume (L) | 2.0 | 1.5 |
| Viscosity (cP) | / | 25 |
| T ° C. in/out | 140/60 | 190/85 |
| Solids content (%) | 0.5 | 1.1 |
| Feed flowrate (L/H) | 0.7 | 0.6 |
| Spraydrying yield (%) | 55 | 72 |

A further experiment was performed using PS 7F. A solution comprising PS 7F was spray dried according to the following parameters.

| Sprayed volume (L) | 1.7 |
| --- | --- |
| Viscosity (cP) | 25 |
| T ° C. in/out | 140/65 |
| Feed flowrate (L/H) | 0.5 |

A fluid powder was produced. The powder was characterized and compared with the powder obtained after the established process of precipitation/drying. The results are

| PS7F | | Precipitation | Spraydrying | Specification |
| --- | --- | --- | --- | --- |
| Q seph flowthrough (QFT) | | 95% | 5% | — |
| Collected product (g) | | 139.6 | 5.7 | — |
| Yield (g/L QFT) | | 1.9 | 1.4 | — |
| H₂O content (% dry weight) | | 1.5 | 6.9 | <15% |
| EtOH content (% dry weight) | | 2.8 | 0.0 | <10% |
| HPSEC (%) | | 77 | 77 | ≥50% |
| H-NMR | Methylpentose (%) | 20.9 | 18.3 | — |
|  | O acetyl (%) | 3.1 | 2.8 | — |

A Q sepharose (Q seph) ion exchange column was used in this example for purification due to the polysaccharide having neutral charge. In summary, the powders produced by each method demonstrated similar properties. High yield was achieved and the spray dried polysaccharide met specification parameters.

A subsequent experiment performed with dissolved PS 7F has shown that integrity of the polysaccharide was conserved after the spraydrying trial. The results are provided below.

|  | Precipitation | Spraydrying |
| --- | --- | --- |
| T ° C. in/out | NA | 190/85 |
| HPSEC | 1004 | 969 |
| MALLS (kDa) | | |
| Rw (nm) | 49.9 | 49.7 |
| Mw/Mn | 1.219 | 1.254 |

Example 10—PS 14

Experiments were performed with dissolved PS 14 which showed that yield may be increased by adjusting the spray drying parameters. The conditions used in the subsequent experiment and summarized in the table below improved final powder in terms of yield, water content and powder fluidity. It was found that by varying certain parameters the spraydrying yield was increased by 7%.

|  | Initial experiment | Subsequent experiment |
| --- | --- | --- |
| Sprayed volume (L) | 1.2 | 2.0 |
| Viscosity (cP) | 50 | 25 |
| T ° C. in/out | 140/65 | 160/80 |
| Solids content (%) | 1.4 | 0.9 |
| Feed flowrate (L/H) | 0.5 | 0.5 |
| Spraydrying yield (%) | 57 | 64 |

A further experiment was performed using PS 14. A solution comprising PS 14 was spray dried according to the following parameters.

| Sprayed volume (L) | 1.0 |
| --- | --- |
| Viscosity (cP) | 25 |
| T ° C. in/out | 140/60 |
| Solids content (%) | 0.75 |
| Feed flowrate (L/H) | 0.76 |

A fluid powder was produced. The powder was characterized and compared with the powder obtained after the established process of precipitation/drying. The results are provided below.

| | PS14 | | |
|---|---|---|---|
| | Precipitation | Spraydrying | Specification |
| Q seph flowthrough (QFT) | 95% | 5% | — |
| Collected product (-g) | 107 | 3.9 | — |
| Yield (g/L QFT) | 1.7 | 1.1 | — |
| H$_2$O content (% dry weight) | 4.9 | 7.9 | <15% |
| EtOH content (% dry weight) | 0.6 | 0.0 | <10% |
| HPSEC (%) | 76 | 74 | ≥45% |
| H-NMR Hexosamine (%) | 26.4 | 26.4 | |

A Q sepharose (Q seph) ion exchange column was used for purification in this example, due to the polysaccharide having neutral charge. In summary, the powders produced by each method demonstrated similar properties. The spray dried polysaccharide met specification parameters.

A subsequent experiment performed with dissolved PS 14 has shown that integrity of the polysaccharide was conserved after the spraydrying trial. The results are provided below.

| | Precipitation | Spraydrying |
|---|---|---|
| T ° C. in/out | NA | 190/85 |
| HPSEC MALLS (kDa) | 1135 | 1104 |
| Rw (nm) | 54.5 | 54.1 |
| Mw/Mn | 1.239 | 1.237 |

SUMMARY

It was demonstrated that these polysaccharides could be successfully spray dried. The spray dried polysaccharides had a similar integrity to those produced using the established precipitation process and met specification. The amount of residual alcohol was reduced in the spray dried samples (due to no alcohol being used in this production method). High yield was also achieved via the spray drying process.

BIBLIOGRAPHY

Baraldoi et al 2004 *Infect Immun* 72; 4884-4887
Chen et al 2010 *Vaccine* 28:5093-5099
Falugi et al 2001 *Eur J Immunol* 31; 3816-3824
Kuo et al 1995 *Infect Immun* 63; 2706-2713
McAdams et al 2012 *Expert Rev Vaccines* 11(10):1211-1219
Ohtake et al 2010 *Vaccine* 1275-1284
Porro et al. 1985 *Mol. Immunol.* 22:907
Zhu et al 2014 *Pharm Res* 31:3006-3018

The invention claimed is:

1. A process for drying an isolated capsular polysaccharide derived from a Gram-positive bacteria comprising the steps of (a) at least one filtration step; and (b) spray drying a liquid composition comprising the isolated capsular polysaccharide, wherein the at least one filtration step is performed before the spray drying step, wherein the liquid composition does not comprise an excipient, and wherein the isolated capsular polysaccharide is an antigen, and wherein the concentration of the isolated capsular polysaccharide in the liquid composition is between 0.5 g/L and 13 g/L.

2. The process according to claim 1, wherein the isolated capsular polysaccharide is derived from *Streptococcus* bacteria.

3. The process according to claim 2, wherein the bacteria are of the species group B *Streptococcus* or *Streptococcus pneumoniae*.

4. The process according to claim 3, wherein the bacteria are of the species *Streptococcus pneumoniae*.

5. The process according to claim 4, wherein the bacteria are of *Streptococcus pneumoniae* serotype 1, 4, 5, 6B, 7F, 9V, 14, 18C, 19F or 23F.

6. The process according to claim 4, wherein the isolated capsular polysaccharide is PS 1, 4, 5, 6B, 7F, 9V, 14, 18C, 19F or 23F.

7. The process according to claim 1, wherein the liquid composition comprises less than 1% (w/w) protectants.

8. The process according to claim 1, wherein the isolated capsular polysaccharide is at least 99% (w/w) pure.

9. The process according to claim 1, wherein the viscosity of the liquid composition is 15 to 95 cP.

10. The process according to claim 1, wherein the process does not include a precipitation step.

11. The process according to claim 1, wherein the liquid composition is not treated with alcohol.

12. The process according to claim 1, wherein the liquid composition is filtered at least twice before being spray dried.

13. The process according to claim 1, wherein the liquid composition comprises an isolated capsular polysaccharide and less than 1% (w/w) carbohydrates other than the isolated capsular polysaccharide.

* * * * *